(12) United States Patent
Zanzig

(10) Patent No.: US 7,294,376 B2
(45) Date of Patent: Nov. 13, 2007

(54) TIRE WITH INDICIA

(75) Inventor: David John Zanzig, Bertrange (LU)

(73) Assignee: The Goodyear Tire & Rubber Company, Akron, OH (US)

( * ) Notice: Subject to any disclaimer, the term of this patent is extended or adjusted under 35 U.S.C. 154(b) by 517 days.

(21) Appl. No.: 10/871,616

(22) Filed: Jun. 18, 2004

(65) Prior Publication Data

US 2005/0049356 A1    Mar. 3, 2005

Related U.S. Application Data

(60) Provisional application No. 60/497,862, filed on Aug. 26, 2003.

(51) Int. Cl.
 *B32B 1/08* (2006.01)
(52) U.S. Cl. .................. 428/36.8; 428/36.91; 428/161; 428/201; 428/421; 428/422
(58) Field of Classification Search .............. 428/36.8, 428/36.91, 161, 201, 421, 422, 492, 521
 See application file for complete search history.

(56) References Cited

U.S. PATENT DOCUMENTS 3,876,616 A * 4/1975 Tang ........................ 525/340
4,987,192 A * 1/1991 Oberster et al. ............ 525/224
6,093,271 A   7/2000 Majumdar ................... 152/116
6,656,551 B1 * 12/2003 Dyl .............................. 428/36.8
6,838,407 B2 * 1/2005 Halladay et al. ............ 502/100
2003/0104213 A1 6/2003 Halladay et al. ............ 428/421
2003/0105218 A1 6/2003 Halladay et al. ............ 524/589
2003/0140999 A1 7/2003 Smith et al. ................ 152/524

FOREIGN PATENT DOCUMENTS

EP          0 744 304       11/1996
WO         WO 02/26857       4/2002

OTHER PUBLICATIONS

Rubber & Plastics News, Aug. 11, 2003, HNBR coatings improve performance of NR parts, pp. 13-15.

* cited by examiner

*Primary Examiner*—Bernard Lipman
(74) *Attorney, Agent, or Firm*—John D. DeLong

(57) ABSTRACT

The present invention provides a pneumatic tire, wherein the tire comprises one or more indicia formed from an elastomeric coating comprising an elastomer selected from the group consisting of: a graft-modified fluoroelastomer grafted to a grafting agent; a hydrogenated copolymer of a conjugated diene and an unsaturated nitrile; and a carboxylated hydrogenated copolymer comprising a repeating unit from a conjugated diene, an unsaturated nitrile, and a carboxyl monomer.

10 Claims, 1 Drawing Sheet

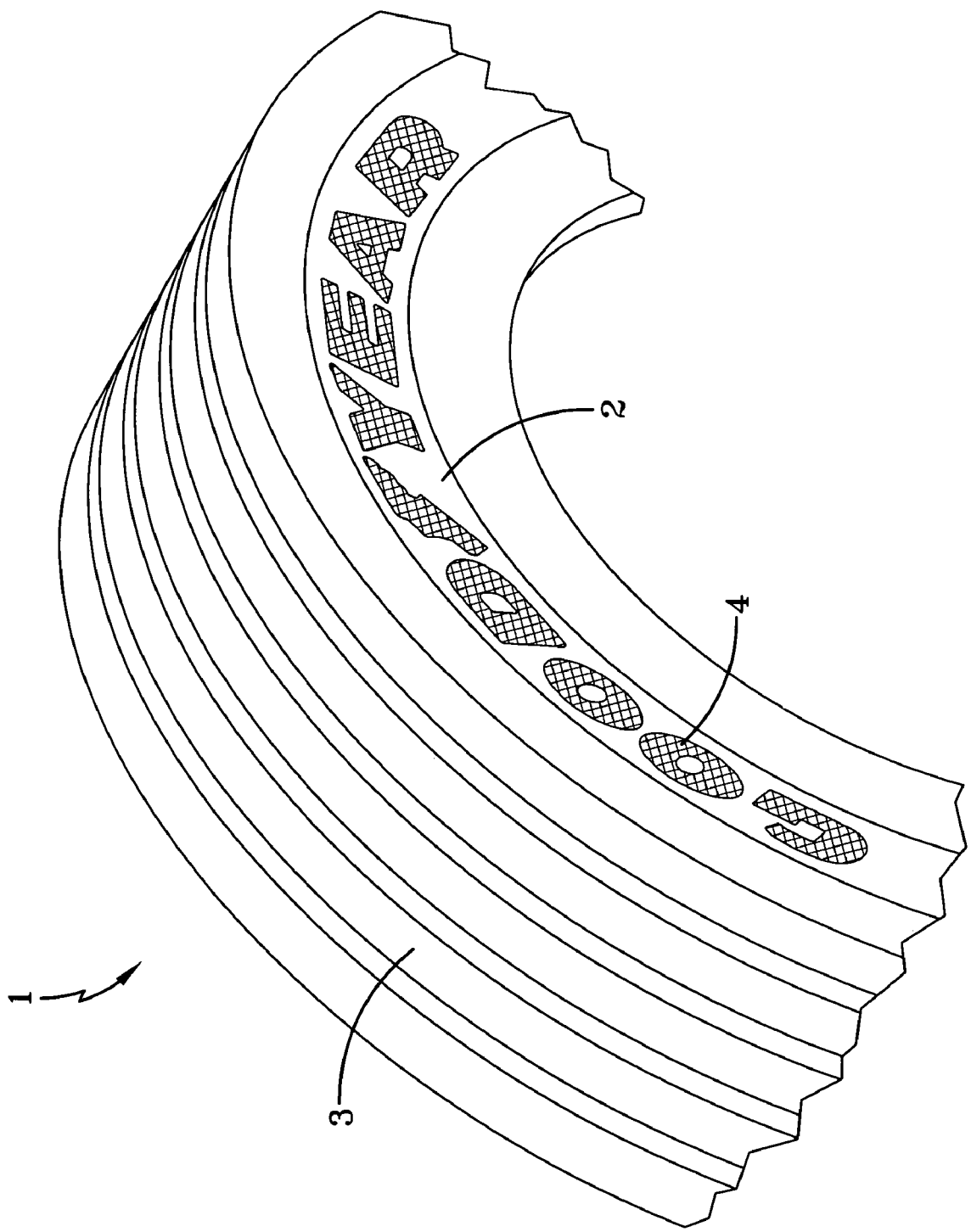

TIRE WITH INDICIA

This application claims the benefit of co-pending Ser. No. 60/497,862, fully incorporated herein by reference.

BACKGROUND OF THE INVENTION

Pneumatic tires often desirably have indicial markings, such as trademarks or other markings. These indicia typically are formed directly into the rubber sidewall during the tire molding process. Thus, the indicia may be raised lettering or other shapes, and may be colored with white pigments or other colorants in the rubber compound.

It is sometimes desired to apply indicia directly to an already molded and cure tire, typically on the sidewall area. To do this, various coatings and paints have been used to form indicia. However, poor adhesion or durability of the coatings usually leads to unacceptable performance of this type of indicia.

It would, therefore, be desirable to have a tire with indicia applied to a cured tire sidewall surface, wherein the indicial coating material offers good adhesion and durability.

SUMMARY OF THE INVENTION

The present invention provides a pneumatic tire, wherein the tire comprises one or more indicia formed from an elastomeric coating comprising an elastomer selected from the group consisting of: a graft-modified fluoroelastomer grafted to a grafting agent; a hydrogenated copolymer of a conjugated diene and an unsaturated nitrile; and a carboxylated hydrogenated copolymer comprising a repeating unit from a conjugated diene, an unsaturated nitrile, and a carboxyl monomer.

BRIEF DESCRIPTION OF THE DRAWING

FIG. 1 depicts a perspective section of a tire (1).

DETAILED DESCRIPTION OF THE INVENTION

The present invention provides a pneumatic tire, wherein the tire comprises one or more indicia formed from an elastomeric coating comprising an elastomer selected from the group consisting of: a graft-modified fluoroelastomer grafted to a grafting agent; a hydrogenated copolymer of a conjugated diene and an unsaturated nitrile; and a carboxylated hydrogenated copolymer comprising a repeating units from a conjugated diene, an unsaturated nitrile, and a carboxyl monomer.

The pneumatic tire having indicia may comprise any vehicle tire as is known in the art. In alternative embodiments, the tire may be any of passenger tires; light, medium or heavy truck tires, off-the-road tires, farm tires, mining tires, aircraft tires, motorcycle tires, and the like.

The pneumatic tire having indicia may have indicia applied to the tire external surface in any desirable shape, such as lettering, trademark figures or logos, and the like. The indicia may also be in the shape or pattern of a sidewall stripe or stripes, such as for a white sidewall. Also envisioned as indicia are decorative markings, such as flowers, dots, short parallel and/or angled stripes or hash marks, or any other shapes as are desired by the user of the tire.

The indicia applied to the tire external surfaces may be from a suitable coating material that will adequately adhere to the tire surface and suitably resist peeling, cracking, and sloughing from the tire. In one embodiment, the coating is a liquid solution of at least one elastomer in a water or solvent-based carrier.

In one alternative embodiment, the indicia may be applied as a water-based elastomer liquid. The elastomer may be dispersed as finely divided polymer particles in the water-based carrier as an emulsion or latex comprising various suitable additives including surfactants, preservatives, and colorants. Other additives may be included in the water-based elastomer liquid as are known in the art. The water-based elastomer may be used as a one part coating application, or as part of a two-part application. In one embodiment, the water-based elastomer may be used as a one-part coating, wherein suitable curing agents are included to promote crosslinking or otherwise cure the elastomer coating. In another embodiment, the water-based elastomer may be used a part of a two part application, wherein suitable curing agents are contained separate from the water-based elastomer, and mixed with the water-based elastomer immediately prior to application on the tire external surface.

In another embodiment, the indicia may be applied as a solvent-based liquid. The elastomer may be partially or completely dissolved or swelled in a suitable organic solvent. Suitable solvents include, but are not limited to, various organic solvents as are known in the art such as cyclohexane, hexane, heptane, octane, decane, dodecane, methylene chloride, chloroform, and the like; and various aromatic solvents such as toluene and the like; halogenated aromatics, various Tolusols generally containing $C_7$ hydrocarbons and significant amounts of aromatic compounds therein, xylene, dichlorobenzene, and the like; diphenyl ether, and the like; ketones including acetone, methyl ethyl ketone, methyl isobutyl ketone, and the like; and alkyl esters such as ethyl acetate, methyl acetate and the like. Solvents may be used singly or as a mixture of one or more solvents. The solvent-based elastomer liquid may be used as a one part coating application or as part of a two-part application. In one embodiment, the solvent-based elastomer may be used as a one-part coating wherein suitable curing agents are included to promote crosslinking or otherwise cure the elastomer. In another embodiment, the solvent-based elastomer may be used as a part of a two-part application, wherein suitable curing agents are contained separate from the solvent-based elastomer, and mixed with the solvent-based elastomer immediately prior to application on the tire external surface.

One suitable solvent-based elastomer is available commercially under the name EnduraLast from the Lord Corporation. This material may be modified through the addition of suitable colorants to obtain the color desirable in the indicia on the tire.

The elastomer usable in either a water-based or solvent-based indicia may be any suitable elastomer that will form a uniform coating on the external surface of the tire and will resist cracking, peeling or sloughing from the surface. In one embodiment, the elastomer may comprise one or more crosslinkable elastomers.

The elastomer may be present in the water-based or solvent-based coating liquid in a concentration suitable to facilitate application of the coating to the tire surface and allow relatively rapid removal of the water or solvent carrier by drying or evaporation or the like. In one embodiment, the elastomer may be present in the water-based or solvent-based coating liquid in a range of about 10 to about 90 percent by weight.

The water-based or solvent-based coating liquid may comprise one or more cure agents as is required to obtain cured indicia on the tire.

In alternative embodiments, the elastomeric coating used to form the indicia may be: a graft-modified fluoroelastomer grafted to a grafting agent as disclosed in U.S. Published Application 2003/0104213, the teachings of which are fully incorporated herein by reference; a hydrogenated copolymer of a conjugated diene and an unsaturated nitrile as disclosed in U.S. Published Application 2003/0105218, the teachings of which are fully incorporated herein by reference; or a carboxylated hydrogenated copolymer comprising a repeating units from a conjugated diene, an unsaturated nitrile, and a carboxyl monomer, as disclosed in U.S. Published Application 2003/0104231, the teachings of which are fully incorporated herein by reference.

In one embodiment, the elastomeric coating used to form the indicia may comprise the reaction product of a graft-modified fluoroelastomer grafted to a grafting agent, the grafting agent comprising a graft-linking group and at least one active hydrogen-bearing group, the reaction product formed by curing said graft-modified fluoroelastomer with a curing agent that contains at least two groups reactive to active hydrogen-bearing groups to crosslink said functionalized fluoroelastomer.

The fluoroelastomer may be selected from the group consisting of a polymer of 1,1-dihydroperfluorobutyl acrylate; copolymer of vinylidene fluoride and chlorotrifluoroethylene; a copolymer of vinylidene fluoride and hexafluoropropylene; a copolymer of vinylidene fluoride and hydropentafluoropropylene; a copolymer of tetrafluoroethylene and propylene; a terpolymer of vinylidene fluoride, hexafluoropropylene, and tetrafluoroethylene; a terpolymer of vinylidene fluoride, tetrafluoroethylene and perfluorovinyl ether; a terpolymer of vinylidene fluoride, tetrafluoroethylene, and propylene; and a terpolymer of vinylidene fluoride, hydropentafluoropropylene and tetrafluoroethylene.

The curing agent contains at least one isocyanate group or a group bearing an isocyanate group, and a group reactive to an active hydrogen-bearing group. The active hydrogen-bearing group may be a hydroxyl or carboxyl group. The grafting agent may be selected from the group consisting of monomeric, oligomeric or polymeric: hydroxyamines, hydroxyalkylamines, aminocarboxylates, hydroxy mercaptans, aminosilanols, aminothiols, mercaptothiols, and mercaptosilanes. The grafting agent may be a mercaptosilane selected from the group consisting of γ-mercaptopropyltrimethoxysilane, γ-mercaptopropyltriethoxysilane, γ-mercaptopropylmethyldimethoxysilane, and γ-mercaptopropylmethyldiethoxysilane.

In another embodiment, the elastomeric coating used to form the indicia comprises the reaction product of: a hydrogenated copolymer of a conjugated diene and an unsaturated nitrile; a phenolic resin; a di- or polyisocyanate; and a curing component. The conjugated diene may be selected from the group consisting of 1,3-butadiene; 2,3-dimethylbutadiene; 1,3-pentadiene; 1,3-hexadiene; 2,4-hexadiene; 1,3-heptadiene; piperylene; and isoprene. The unsaturated nitrile may be acrylonitrile or methacrylonitrile.

The phenolic resin may be prepared by reacting a phenolic compound with an aldehyde compound under acidic, neutral or basic conditions with an appropriate catalyst; the phenolic compound may be selected from the group consisting of phenol, p-t-butylphenol, p-phenylphenol, m-bromophenol, o-chlorophenol, p-chlorophenol, p-alkoxyphenol, o-cresol, m-cresol, p-cresol, 2-ethylphenol, amylphenol, nonylphenol, xylenol, naphthol, carvacrol, cashew nutshell liquid, resorcinol, orcinol, phloroglucinol, pyrocatechol, pyrogallol, salicylic acid, bisphenol A, bisphenol S, and combinations thereof; and the aldehyde compound may be selected from the group consisting of formaldehyde, acetaldehyde, propionaldehyde, isobutyraldehyde, 2-ethylbutrylaldehyde, 2-methylpentaldehyde, 2-ethylhexaldehyde, paraformaldehyde, trioxane, furfural, hexamethylenetetramine, and benzaldehyde.

The curing component may comprise elemental sulfur in combination with an organic accelerator selected from a derivative of a dithocarbamic acid, a xanthogenic acid, or a thiuram sulfide.

The di- or polyisocyanates may be selected from the group consisting of 1,6-hexamethylene diisocyanate; 1,8-octamethylene diisocyanate; 1,12-dodecamethylene diisocyanate; 2,2,4-trimethylhexamethylene diisocyanate, and the like; 3,3'-diisocyanatodipropyl ether; 3-isocyanatomethyl-3,5,5'-trimethylcyclodexyl isocyanate; hexamethylene diisocyanate; 4,4'-methylene-bis(cyclohexyl isocyanate); cyclopentalene-1,3-diisocyanate; cyclodexylene-1,4,-diisocyanate; methyl 2,6-diisocyanatocaprolate; bis-(2-isocyanatoethyl)-fumarate; 4-methyl-1,3-diisocyanatocyclohexane; trans-vinylene diisocyanate; 4,4'-methylene-bis(cyclohexylisocyanate); methane diisocyanates; his-(2-isocyanatoethyl)carbonate; N,N',N"-tris-(6-isocyanatohexamethylen-e) biuret, toluene diisocyanates; xylene diisocyanates; dianisidine diisocyanate; 4,4'-diphenylmethane diisocyanate; 1-ethoxy-2,4-diisocyanatobenzene; 1-chloro-2,4-diisocyanatobenzene; bis(4-isocyanatophenyl)methane; tris(4-isocyanatophenyl)methane; naphthalene diisocyanate; 4,4'-biphenyl diisocyanate; m-phenylene diisocyanate; p-phenylene diisocyanate; 3,3'-dimethyl-4,4'-biphenyl diisocyanate; p-isocyanatobenzoyl isocyanate; tetrachloro-1,3-phenylene diisocyanate; isocyanate; tetrachloro-1,3-phenylene diisocyanate; 2,4-toluene diisocyanate; 2,6-toluene diisocyanate; 4,4'-isocyanate, bis-[isocyanatophenyl] methane; polymethylene poly(phenyl isocyanate); isophrone diisocyanate; and mixtures thereof.

In another embodiment, the elastomeric coating used to form the indicia may comprise the reaction product of: a carboxylated hydrogenated copolymer comprising a repeating units from a conjugated diene, an unsaturated nitrile, and a carboxyl monomer; and a curing component containing at least one isocyanate group and another group which forms crosslinks. The conjugated diene may be selected from the group consisting of 1,3-butadiene; 2,3-dimethylbutadiene; 1,3-pentadiene; 1,3-hexadiene; 2,4-hexadiene; 1,3-heptadiene; piperylene; and isoprene. The unsaturated nitrile may be acrylonitrile or methacrylonitrile.

The curing component may be a di- or polyisocyanate selected from the group consisting of 1,6-hexamethylene diisocyanate; 1,8-octamethylene diisocyanate; 1,12-dodecamethylene diisocyanate; 2,2,4-trimethylhexamethylene diisocyanate, and the like; 3,3'-diisocyanatodipropyl ether; 3-isocyanatomethyl-3,5,5'-trimethylcyclodexyl isocyanate; hexamethylene diisocyanate; 4,4'-methylene-bis(cyclohexyl isocyanate); cyclopentalene-1,3-diisocyanate; cyclodexylene-1,4,-diisocyanate; methyl 2,6-diisocyanatocaprolate; bis-(2-isocyanatoethyl)-fumarate; 4-methyl-1,3-diisocyanatocyclohexane; trans-vinylene diisocyanate; 4,4'-methylene-bis(cyclohexylisocyanate); methane diisocyanates; bis-(2-isocyanatoethyl)carbonate; N,N',N"-tris-(6-isocyanatohexamethylene)biuret, toluene diisocyanates; xylene diisocyanates; dianisidine diisocyanate; 4,4'-diphenylmethane diisocyanate; 1-ethoxy-2,4-diisocyanatobenzene; 1-chloro-2,4-diisocyanatobenzene; bis(4-isocyanatophenyl)methane; tris(4-isocyanatophenyl)methane; naphthalene diisocyanate; 4,4'-biphenyl diisocyanate; m-phenylene diisocyanate; p-phenylene diisocyanate; 3,3'-dimethyl-4,4'-biphenyl diisocyanate; p-isocyanatobenzoyl isocyanate; tetrachloro-1,3-phenylene diisocyanate; isocyanate; tetrachloro-1,3-phenylene diisocyanate; 2,4-toluene diisocyanate; 2,6-toluene diisocyanate; 4,4'-isocyanate, bis-[isocyanatophenyl]methane; polymethylene poly(phenyl isocyanate); isophrone diisocyanate; and mixtures thereof.

The curing component may be an organosilane which contains an isocyanate group and another group selected from the group consisting of an epoxy-bearing group, a mercapto group, a mercapto-bearing group, a vinyl group, a vinyl-bearing group, another isocyanate group, an isocyanate-bearing group, an ureido group, an ureido-bearing group, an imidazole group and an imidazole-bearing group. The organosilane may be an isocyanato-alkoxy silane. The isocyanate-alkoxy silane may be γ-isocyanatopropyltrimethoxysilane or γ-isocyanatopropyltriethoxysilane.

The water-based or solvent-based coating liquid used to form the indicia may comprise one or more colorants as are desired to impart a given color to the indicia on the tire. The color imparted by the colorants is not limited, and may include any color obtainable with known colorant additives. The colorants may include any suitable dyes, pigments, or the like that impart the desired color. The colorants may be included in the water or solvent-based coating liquid, or mixed with the coating liquid immediately prior to application to the tire. The relative amount of colorant to be added to the coating liquid is dependent on the type of colorant, the desired color, and the desired intensity of the color, as would be appreciated by one of skill in the art without undue experimentation.

Dyes are generally defined as compounds which contain groups that confer color, generally called chromophores. More information on dyes in general is available in *The Chemistry of Synthetic Dyes*, Volumes I and II by K. Venkaktaraman, 1952, published by Academic Press, Inc., New York, and in *Organic Chemistry* by W. T. Caldwell, 1943, published by Houghton Mifflin Company in its chapter entitled "Synthetic Dyes," Pages 702 through 725.

The coating compositions used to form the indicia also may contain color pigments, including inorganic pigments, such as titanium dioxide, talc, mica, iron oxides, lead oxides, chromium oxides, lead chromate and carbon black, including conductive carbon black, and organic pigments such as phthalocyanine blue and phthalocyanine green, as well as a variety of other color pigments.

The water-based or solvent-based coating liquid used to form the indicia is applied to one or more external surfaces of a tire by any of various application methods as are known in the art, including spraying, brushing, rolling, submersion, and dipping, wiping, and the like. In one embodiment, the water-based or solvent-based coating liquid is sprayed onto one or more external surfaces of the tire, with templates used to define the indicia. The spray is applied manually or automatically using spray application devices as are known in the art. In another embodiment, the liquid is applied from a roller with precut indicial markings on the roller, and the liquid transferred from the precut markings to the tire surface.

To promote adhesion of the applied indicia, the external surfaces of the tire may require preliminary preparation prior to application of the water-based or solvent-based coating. In one embodiment, the external tire surfaces may be cleaned of dirt, oils, and other contaminants using an aqueous detergent solution or other cleaning material. Mold release agents such as silicone mold release agents that may interfere with adhesion may be removed using solvents such as alcohols and the like. The external tire surfaces may further be prepared by application of a suitable primer material. In one embodiment, the external tire surface may be pretreated with a chlorinating agent such as sodium hypochlorite and hydrochloric acid, or with a cyanuric acid solution. One example of a chlorinating agent is commercially available under the tradename Chemlok® 7701. The primer may be applied to the surface of the elastomeric material by brushing, dipping, spraying, wiping, or the like, after which the primer is allowed to dry.

To further promote adhesion of the coating to the tire surface, the tire rubber may comprise particular agents that promote adhesion. One such approach is taught in U.S. Pat. No. 4,669,517, fully incorporated herein by reference, wherein it is disclosed to add at least one hydroxyl terminated diene polyol to the tire rubber compound to promote adhesion.

As a further way to promote adhesion, it may be desirable to use a tire produced without the use of silicone type mold release agents. Such agents, as are typically used in manufacture of tires, may interfere with the adhesion of the elastomer coating.

After any preliminary surface preparation and priming, the water-based or solvent-based coating material may be applied to the external tire surface by one of the aforementioned methods. In one embodiment, the coating material containing suitable colorant and curing agents is sprayed onto an external surface of the tire. The coating solution is applied in a manner sufficient to form the desired indicia, where the thickness of the coating when cured is suitable to prevent cracking, peeling, and sloughing from the tire surface. In one embodiment the coating thickness may be from about 0.1 to about 2 microns. In another embodiment, the coating thickness may be from about 0.25 to about 1 microns.

FIG. 1 shows a tire (1) with a sidewall portion (2) and tread portion (3). In the sidewall portion (2), yellow letters and wingfoot logo (4) are formed by application of a liquid subsequent to vulcanization of the tire. The yellow letters and wingfoot logo (4) are of an elastomeric composition as described herein.

While present exemplary embodiments of this invention and methods of practicing the same have been illustrated and described, it will be recognized that this invention may be otherwise variously embodied and practiced within the scope of the following claims.

What is claimed is:

1. A pneumatic tire comprising one or more indicia on an external surface of the tire, said indicia formed from an elastomeric coating comprising a graft-modified fluoroelastomer grafted to a grafting agent, wherein the indicia thickness ranges from about 0.1 to about 2 microns.

2. The pneumatic tire of claim 1, wherein said elastomeric coating comprises the reaction product of a graft-modified fluoroelastomer grafted to a grafting agent, the grafting agent comprising a graft-linking group and at least one active hydrogen-bearing group, said reaction product formed by curing said graft-modified fluoroelastomer with a curing agent that contains at least two groups reactive to active hydrogen-bearing groups to crosslink said functionalized fluoroelastomer.

3. The pneumatic tire of claim 1, wherein said fluoroelastomer is selected from the group consisting of a polymer of 1,1-dihydroperfluorobutyl acrylate; copolymer of vinylidene fluoride and chlorotrifluoroethylene; a copolymer of vinylidene fluoride and hexafluoropropylene; a copolymer of vinylidene fluoride and hydropentafluoropropylene; a copolymer of tetrafluoroethylene and propylene; a terpolymer of vinylidene fluoride, hexafluoropropylene, and tetrafluoroethylene; a terpolymer of vinylidene fluoride, tetrafluoroethylene and perfluorovinyl ether; a terpolymer of vinylidene fluoride, tetrafluoroethylene, and propylene; and a terpolymer of vinylidene fluoride, hydropentafluoropropylene and tetrafluoroethylene.

4. The pneumatic tire of claim 2, wherein said curing agent contains at least one isocyanate group or a group bearing an isocyanate group, and a group reactive to an active hydrogen-bearing group.

5. The pneumatic tire of claim 4, wherein said active hydrogen-bearing group is a hydroxyl or carboxyl group.

6. The pneumatic tire of claim 2, wherein said grafting agent is selected from the group consisting of monomeric, oligomeric or polymeric: hydroxyamines, hydroxyalkylamines, aminocarboxylates, hydroxy mercaptans, aminosilanols, aminothiols, mercaptothiols, and mercaptosilanes.

7. The pneumatic tire of claim 2, wherein said grafting agent is a mercaptosilane selected from the group consisting of γ-mercaptopropyltrimethoxysilane, γ-mercaptopropyltriethoxysilane, γ-mercaptopropylmethyldimethoxysilane, and γ-mercaptopropylmethyldiethoxysilane.

8. The pneumatic tire of claim 1, wherein said elastomeric coating comprises at least one colorant, and said indicia are colored.

9. The pneumatic tire of claim 1, wherein said indicia comprise one or more shapes selected from lettering, trademark figures or logos, flowers, dots, stripes, and short parallel and/or angled stripes or hash marks.

10. The pneumatic tire of claim 1 wherein the coating thickness ranges from about 0.25 to about 1 microns.

* * * * *